United States Patent [19]
Crowdis

[11] Patent Number: 5,163,079
[45] Date of Patent: Nov. 10, 1992

[54] ANALOG/DIGITAL TELEPHONE TEST SET

[76] Inventor: Raymond C. Crowdis, Belmont Rd., Box 4, Site 9, RR #7, Saint John, N.B., Canada, E2L 3W7

[21] Appl. No.: 626,058

[22] Filed: Dec. 12, 1990

[30] Foreign Application Priority Data

Nov. 9, 1990 [CA] Canada .................................. 2029679

[51] Int. Cl.$^5$ .......................... H04M 3/30; H04B 3/46
[52] U.S. Cl. ......................................... 379/27; 379/29
[58] Field of Search .................. 379/22, 27, 28, 29

[56] References Cited

U.S. PATENT DOCUMENTS 4,551,585  11/1985  Daniels et al. ......................... 379/27

Primary Examiner—Stafford D. Schreyer
Attorney, Agent, or Firm—David Newman & Associates

[57] ABSTRACT

An analog/digital telephone test set for telephone lines using dial pulse, DTMF, and digital signalling having a DTMF decoder for converting DTMF tones for application to a microprocessor which converts them, for example, to 16 bit digital commands transmitted as 8 kHz bursts.

4 Claims, 3 Drawing Sheets

ANALOG/DIGITAL TELEPHONE TEST SET

BACKGROUND OF THE INVENTION

1. Field of the Invention

The present invention relates generally to the testing of telephone lines and systems, and particularly to telephone test sets for accessing and testing subscriber lines. More particularly still, it relates to a telephone test set capable of testing subscriber lines emanating from different switching centres which use the following modes of signalling: dial pulse; DTMF or tone signalling; and digital command signalling on subscriber lines associated, for example, with the now widely used Northern Telecom DMS-100 switching system.

2. Prior Art of the Invention

Prior art telephone line testing devices may be used on telephone lines by simply connecting them to the tip and ring leads. U.S. Pat. No. 4,194,098 granted Mar. 18, 1980 to Carlson and U.S. Pat. No. 4,682,346 granted Jul. 21, 1987 to Faith et al provides such test sets which are capable of operating on telephone lines which use either of dial pulse or DTMF signalling both of these United States Patents are relevant prior art as far as the dial pulse and DTMF signalling functions are concerned. Both United States Patents are incorporated herein by reference.

On telephone lines switched using a digital telephone switch such as Northern Telecom's DMS-100 such prior art devices cannot be used. A factor in such incompatibility is that although the prior art devices have included universal signalling test systems (U.S. Pat. No. 4,165,450) and occasionally had selective D.C. impedances of 600 ohms and 900 ohms (U.S. Pat. Nos. 4,843,620 and 4,912,755) they have generally had impedances in the range of 70 to 300 ohms. A digital telephone line requires the testing device D.C. impedance to be in the range of 1000 to 2000 ohms. Overcoming such incompatibility would simplify the number and type of devices that would be needed to test telephone lines in various telephone line systems.

Prior art devices for testing the circuitry of telephone lines have included memory dialers. They have also included batteries to provide power to the memory circuitry when the device is not connected to the tip line and ring line as a source of power. Batteries have various replacement and maintenance problems associated with them. Such problems could be overcome by using a different power source for the memory circuitry.

Moreover, prior art devices have included a shunt circuit to limit the current applied to the device. Usually, such shunt circuits have comprised sensing circuits and a silicon controlled rectifier to shunt current from an overcurrent condition between the tip line and ring line.

Additionally, prior art devices have included light emitting diodes in series with voice receiving and transmitting units. Alternatively, the diodes were installed across the tip line and ring line with a switch to momentarily test the polarity of the voltage on the tip and ring lines.

Finally, prior art devices included circuitry producing a short between the tip and ring lines to keep large currents out of the device. Such circuitry could result, if the large current was from an unfused source or a source with a high current fuse (such as 15 amperes or higher), in damage to the devices and injury to a person using them. Such damage and injury may be avoided by opening the tip and ring lines, not allowing current to flow.

SUMMARY OF THE INVENTION

In order to provide a more versatile telephone test set capable of accessing telephone lines and systems employing digital signalling in addition to dial pulse and DTMF tone signalling, the present invention utilizes a programmable microprocessor to accommodate the requirement for one or more digital signalling functions and formats.

Accordingly, the present invention provides an analog/digital telephone test set, wherein the DTMF tone signals generated are applied to a DTMF decoder then to a programmable microprocessor, which converts that decoded DTMF signals to a series of digital command signals to be applied to the telephone line. The format of the signalling commands generated by the microprocessor is predetermined by the therein stored firm- or software. An example of such software for converting DTMF signalling to signalling commands comprising 16 bit data words is given herein as below. In case of Northern Telecom's DMS-100 switching system, the 16 bit data words are transmitted by turning on and off and eight kilo-hertz tone at the rate of 1 kilohertz, all of which is generated by the microprocessor as programmed. Of course, other signalling formats and carrier frequencies may be programmed.

According to a broad aspect of the present invention, there is provided an analog/digital telephone test set for connection to a telephone line having DTMF signalling means for signalling on analog telephone lines, comprising: (a) DTMF decoding means for converting DTMF tones to microprocessor compatible signals; and (b) microprocessor means for responding to said DTMF decoding means in a preprogrammed manner by outputting digital signals for signalling on digital telephone lines.

BRIEF DESCRIPTION OF THE DRAWINGS

The preferred embodiment of the present invention will now be described with reference to the annexed drawings, in which.

DESCRIPTION OF THE PREFERRED EMBODIMENT

Figure 1:
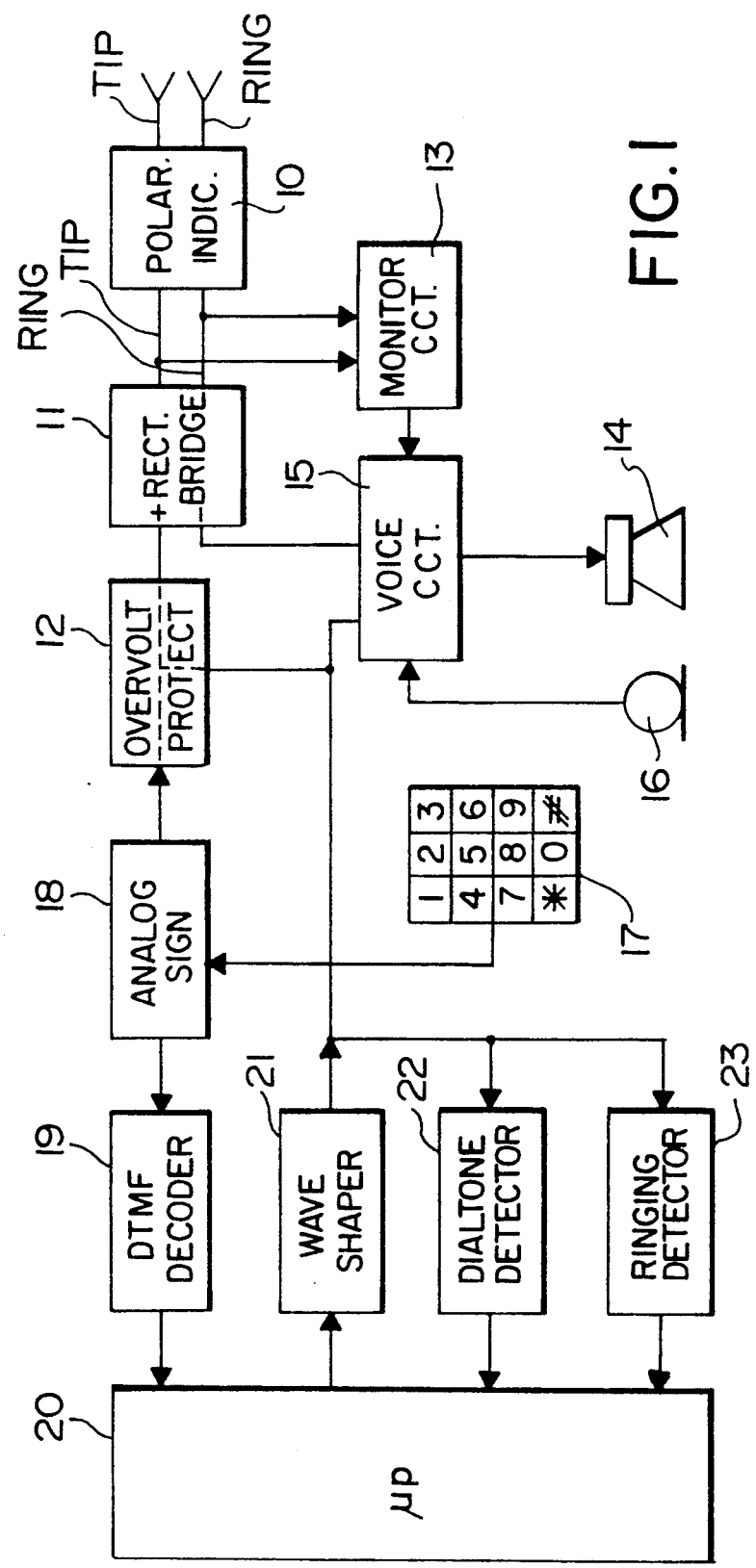
FIG. 1 is a system functional block diagram of the analog/digital telephone test set according to the present invention.

Referring to FIG. 1 of the drawings, the preferred analog/digital telephone test set of the present invention comprises a polarity indicator 10 adapted for connection across the tip and ring leads of a telephone line to be tested, followed by a full-wave bridge rectifier 11 and an overvoltage protection circuit 12 connected to the positive output of the rectifier 11. Also connected across the tip and ring leads is a monitor circuit 13 which is essentially a voice transformer connectable to a loudspeaker or earphone 14. When not in only monitor mode the loudspeaker 14 is driven by a voice circuit 15 to which a microphone 16 is also connected. A standard push-button dial pad 17 serves as the user's signalling input to an analog signalling circuit 18, which outputs either DTMF tone or dial pulse signals directly onto the tip and ring leads via the rectifier bridge 11; or, in digital signalling mode, the analog signalling circuit 18 applies the generated DTMF tones to a DTMF tone decoder 19, the output of which is read and interpreted by a controlling microprocessor 20. The latter then generates a keyed 8 kHz tone signal encoding the 16 bit data words necessary for signalling the DMS-100 switching machine, which signal is applied to a digital wave shaper 21 before being output onto the tip and ring leads. A dial tone detector 22 detects dial tone and a ringing detector 23 detect dial tone and ringing on the tip and ring leads, respectively, and apply their outputs to the microprocessor 20, which processes such information.

Figure 2:
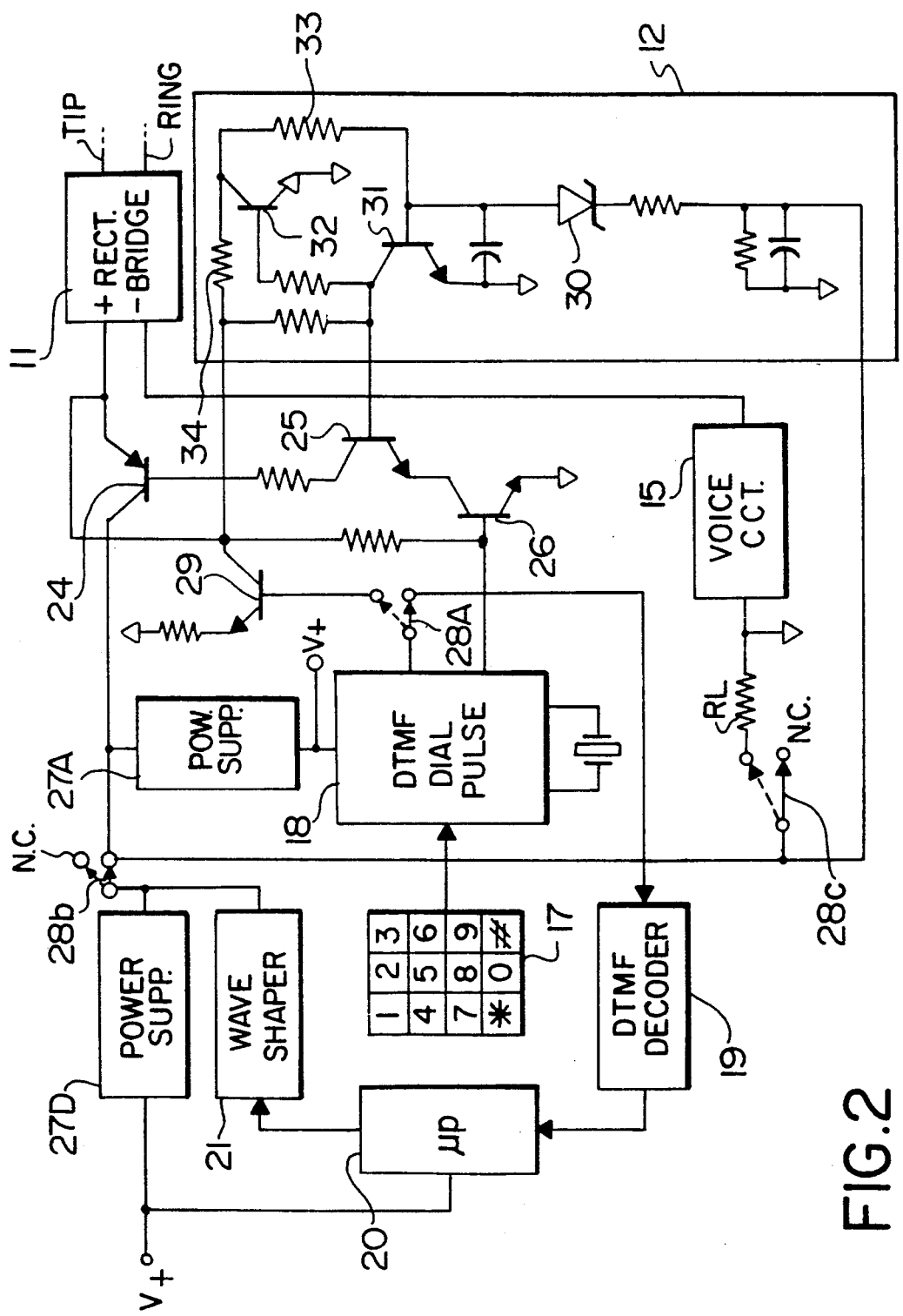
FIG. 2 is a more detailed block/schematic diagram illustrating different modes of operation of the system shown in FIG. 1.

FIG. 2 of the drawings shows in more detail the interconnection of the functional blocks under analog and digital modes of operation. The positive output of the rectifier bridge 11 is connected to the emitter of switching transistor 24, which is controlled via transistors 25 and 26 by the dial pulse output of the analog signalling circuit 18 and which interrupts the line current when switched off, thus causing dial pulse signalling. Unless the latter is occurring the transistor 24 is switched on and is transparent, conducting line power to power supplies 27A and 27D from the bridge 11, as well as conducting signalling from and to the tip and ring leads. When in DTMF tone signalling mode, the DTMF output of the analog signalling circuit is connected via switch 28a to the base of transistor 29 and though its collector to the positive output of the bridge 11, i.e. onto the tip and ring leads to the telephone system. As shown in FIG. 2, switches 28a, 28b and 28c are in the position of digital signalling, thus power is applied to the power supply 27D, and the DTMF output of the circuit 18 is shown connected to the DTMF decoder 19, while resistor $R_L$ disconnected raising the impedance across tip and ring, and the digital signalling output of the microprocessor 20 is applied via the digital wave shaper 21 and the switch 28b as well as the transistor 24 to the bridge 11 and hence onto the tip and ring leads. As voltage at the collector of the transistor 24 exceeds the zero voltage of zener diode 30, the latter conducts causing transistor 31 to conduct and through its collector causing the transistor 25 to switch off, which in turn switches the transistor 24 off, thus removing the high voltage from its collector. As the transistor 31 is turned on, so will transistor 32 be turned off, while the former continues to conduct because of resistors 33 and 34 connecting its base to the positive output of the bridge 11, which is the immediate source of the high voltage. Of course, once the latter no longer exists, the transistor 31 will switch off without untoward consequences.

Figure 3:
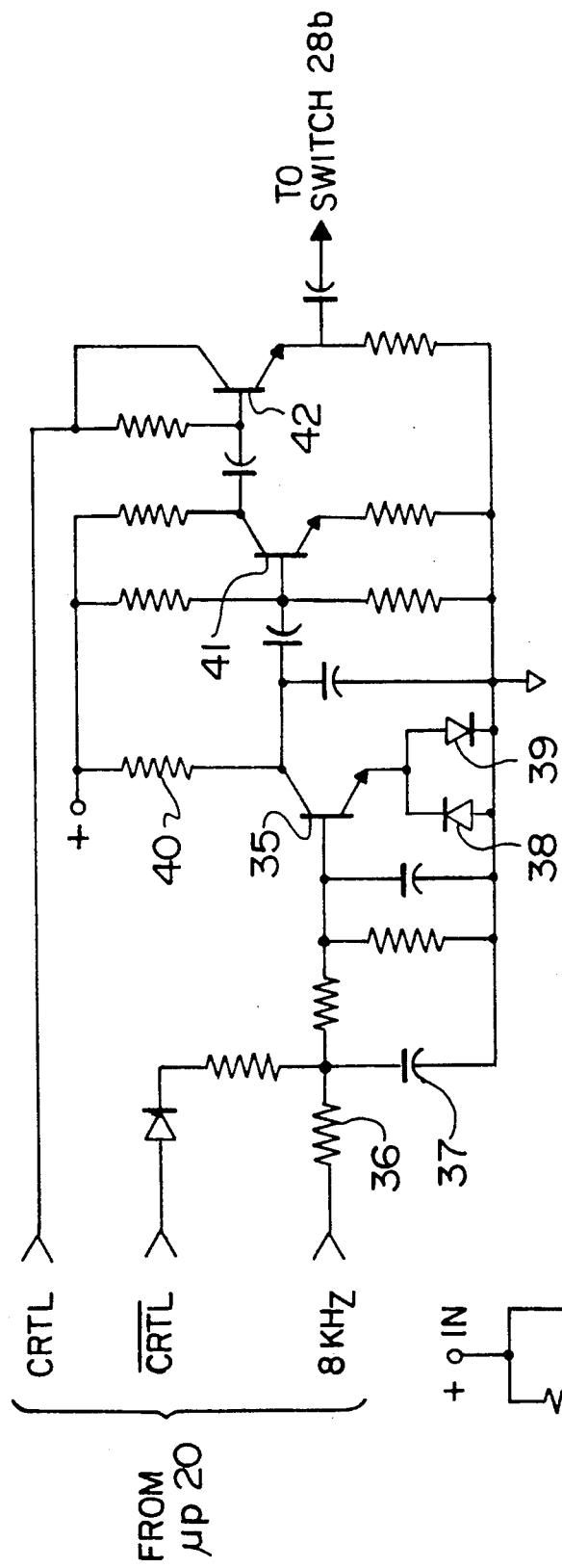
FIG. 3 is a schematic diagram of the wave shaper.

Referring to FIG. 3, it shows the wave shaper circuit 21 in detail. This circuit is necessary because the microprocessor 20 generates square waves referenced to zero volts. The signalling requirement on a digital line is that a "1" data bit is represented by eight cycles of an 8 kHz sine wave of 1.2 volts peak-to-peak be placed on the tip and ring leads of the telephone line; while a "0" data bit is represented by the absence of the 8 kHz frequency for one millisecond. The microprocessor 20 is a Motorola MC68HCO5J1 and generates the 8 kHz signal at its pin 15 output, which is applied to the base of transistor 35 via two resistors. The base of the transistor 35 is biased via +4 Volts applied from the microprocessor 20 pin 14 (CRTL). The 8 kHz square wave applied from pin 15 is integrated by means of resistor 36 and capacitor 37 into a triangular wave before it is applied to the transistor 35, at the emitter of which diodes 38 and 39 and resistor 40 at its collector smooth the triangular wave into an approximate sine wave. The latter is capacitively coupled to transistor 41 and further to an output transistor 42, the emitter of which is capacitively coupled to the switch 28b for application to the tip and ring leads. In order to conserve power when not signalling, the microcomputer 20 by means of pin 13 (CRTL) is used to power the output transistor 42.

Figure 4:
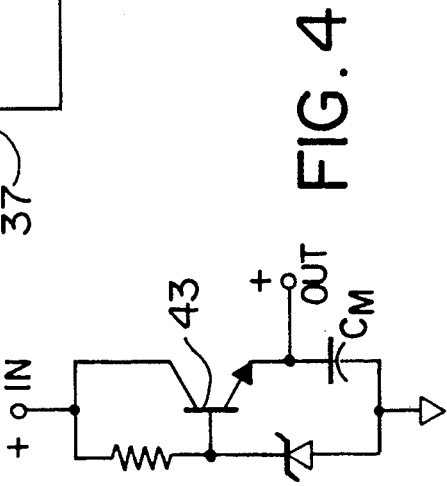
FIG. 4 is a schematic diagram of the power supplies.

FIG. 4 is a schematic of each of the power supplies 27A and 27D, which yield +5 Volts at the emitter of transistor 43. A memory backup capacitor CM of 0.47 Farads of the type normally used in computers is used to provide memory backup.

As for the circuits not given in detail in the drawing figures, they all are off-the-shelf circuits and are used in the preferred embodiment as suggested by their suppliers in the respective data sheets. These circuits are:
Rectifier Bridge 11: ITT DFO6M
Voice Circuit 15: MOSTEK L3280
Analog Sign. Cct. 18: MOSTEK MK5375
DTMF Decoder 19: MITEL MT8870
Dial Tone Detector 22 and Ringing Detector 23: EXAR XR-L567

The Motorola microprocessor 20 controls the digital mode of operation in the following manner. Once powered by switching the set to digital mode, the processor 20 monitors two of its input pins. It monitors pin 12 to determine if ringing tones are present on the subscribers' line and if so flashes a light emitting diode (connected to pin 16) at a rate of 10 PPS to indicate to the user that ringing is present. The microcomputer 20 also monitors pin 18 to determine if any digits have been dialed. If the microcomputer 20 sees pin 18 go low, (from 5 to 0 volts) it reads the digit that has been keyed on pins 5,6,7, and 8. Each digit is represented by a binary code, the binary bit "1" is represented by 5 volts present and the binary bit "0" is represented by 0 volts present. As digits are keyed they are stored unitl an "*" digit has been keyed. When the "*" digit is keyed it is an indication to the microcomputer 20 that it should send out a 16 bit code over the tip and ring of the subscribers' line to tell the central office which telephone number it wants associated with the subscribers' line. Upon receiving the 16 bit code the central switching office then assigns the requested telephone number to the subscribers' telephone line and returns dial tone. The microcomputer notes that dial tone has been received (pin 17 goes low) and turns on light a emitting diode by placing 0 volts on pin 16. At this point any digit that is keyed on the keypad 17 is automatically converted by the microcomputer 20 to a 16 bit code and sent over the tip and ring lines to the central switching office. If an "*" digit is the first digit dialed the microcomputer sends a default 16 bit code to the central office to select the first or primary telephone number associated with the subscribers' line being used. When the user has completed using the telephone test set they must send an on-hook condition to the central office to inform it to disassociate the used telephone number with the line being used. This is accomplished by keying an "#" digit to the microcomputer which then generates the 16 bit onhook signal. The microcomputer 20 then turns the light emitting diode connected to pin 16 off.

The entire program for the MC68HCO5J1 microprocessor 20, with commentary, is as follows:

```
$CHIP = 68HC05J1

TCSR     EQU       $08

;*******************************************************************
         DEFSEG    RESERVED,ABSOLUTE
         SEG       RESERVED
         ORG       $0
PORTA    DS        1                    ; I/O PORT A
PORTB    DS        1                    ; I/O PORT B
         DS        1
         DS        1
DDRA     DS        1                    ; Data direction register for port A
DDRB     DS        1                    ; Data direction register for port B
         DS        1
         DS        1

ORG       $001F
TEST     DB        1

;*******************************************************************
         DEFSEG    RAM,ABSOLUTE
         SEG       RAM
         ORG       $00C0
FLAGS    DB        0
DIGIT    DB        0
ADDRESS  DB        0
FIRST    DB        0
SECOND   DB        0
BITS     DB        0
PULSES   DB        0
COUNT    DB        0
TIME     DB        0
LINE     DB        0
TEMP     DB        0
FIRSTA   DB        0
SECONDA  DB        0
;*******************************************************************
         DEFSEG    CONST,ABSOLUTE
         SEG       CONST
         ORG       $0300
LIST     DB        $08                  ; Keypad digit "1".
         DB        $09                  ; Keypad digit "2".
         DB        $0A                  ; Keypad digit "3".
         DB        $0C                  ; Keypad digit "4".
         DB        $0D                  ; Keypad digit "5".
         DB        $0E                  ; Keypad digit "6".
         DB        $10                  ; Keypad digit "7".
         DB        $11                  ; Keypad digit "8".
         DB        $12                  ; Keypad digit "9".
         DB        $15                  ; Keypad digit "0".
         DB        $14                  ; Keypad "*".
         DB        $16                  ; Keypad "#".

;*******************************************************************
         DEFSEG    INIT,ABSOLUTE
         SEG      INIT
         ORG      $0320
         RSP
RESET:   LDA      #$01
         STA      TEST
         LDA      #%10111100           ;CONFIGURE PORTA AS OIOOOOII
         STA      DDRA
```

```
              LDA       #%00000000              ;CONFIGURE PORTB AS XXIIIIII
              STA       DDRB
              STA       LINE
              STA       ADDRESS

LDA       #%00000011
              STA       TCSR                    ;TURN TIMER OFF
;****************************************************************************
; This section is used to restart the program loop by initializing
; variables and outputs.

BCLR      0,FLAGS                 ; Reset line flag.
              BCLR      1,FLAGS                 ; Reset address flag.
              BCLR      2,FLAGS                 ; Reset line recieved flag.
              BSET      2,PORTA                 ; Turn off dial/line LED.
              BSET      4,PORTA
              BCLR      5,PORTA
              BCLR      3,PORTA                 ; Set EBS signal low.
              BCLR      5,FLAGS
              BCLR      4,FLAGS JSR       DELAY
;****************************************************************************
; This loop waits for a TT code and a dial tone.

TT:           BRSET     2,FLAGS,CODES           ; If line detected, branch to codes.
              BRCLR     6,PORTA,RINGING
              BRCLR     5,FLAGS,CODES
              BRSET     1,PORTA,CODES           ; Dial tone detection.
              JSR       DELAY
              JSR       DELAY
              SWI
              JSR       DELAY
              BRSET     1,PORTA,CODES           ; Double check for dial tone.
              JSR       OFFHOOK
              BCLR      2,PORTA                 ; Turn on dial/line LED.
              BSET      2,FLAGS                 ; Set dial tone detect flag.
              BRA       CODES RINGING:      LDA       PORTA                   ; Read PORTA and toggle status of
              EOR       #%00000100              ; LED.
              STA       PORTA
              JSR       DELAY
              SWI
              BRCLR     6,PORTA,RINGING
              BSET      2,PORTA                 ; Turn LED off.

CODES:        SWI
              BRCLR     0,PORTA,TT
              JSR       DELAY
LO:           NOP
              BRSET     0,PORTA,LO
              JSR       DELAY

;****************************************************************************
; This subroutine sends or transmits a two byte (16 bit) code.
; The code is located in FIRST and SECOND. The burst length is 1 ms.
; The signal for a "1" is an 8 Khz pulse witch is on 62 micro sec.
; and off 63 microseconds.

SEND:         LDA       #8                      ; 8 pulses are required for
              STA       PULSES                  ; a 1ms burst for a "1" bit.
              STA       PULSES
              ROL       SECOND
              ROL       FIRST
              BCS       TION
```

```
TXOFF:  LDA   PORTA         ; Read PORTA, then change bits
        AND   #%11000111    ; required for control and signal.
        ORA   #%00110000
        STA   PORTA
        STA   PORTA LDA   #98
A:      NOP
        DECA
        INCA
        DECA
        NOP
        NOP
        NOP
        BNE   A
        NOP
        NOP

DEC   BITS
        BNE   SEND
        BCLR  5,PORTA
        RTS

TXON:   LDA   PORTA
        AND   #%11000111
        ORA   #%00101000
        STA   PORTA
        STA   PORTA

LDA   #10
B:      NOP
        NOP
        DECA
        BNE   B
        NOP
        NOP
        NOP

DEC   PULSES
        BEQ   END
        BCLR  3,PORTA

LDA   #10
C:      NOP
        NOP
        DECA
        BNE   C

NOP
        NOP
        NOP
        ROLA

BRA   TXON

END:    BCLR  3,PORTA

LDA   #7
D:      NOP
        NOP
        DECA
        BNE   D
        NOP
        ROLA
        ROLA
        ROLA
```

```
            DEC     BITS
            BNE     SEND
            BSET    4,PORTA
            BCLR    5,PORTA
            RTS
```

;*****************************************************************
; This subroutine provides approximately a 50 ms delay.

```
DELAY:      LDA     #50
            STA     COUNT
            LDA     #99
L1:         STA     TIME
L2:         NOP
            NOP
            NOP
            NOP
            NOP
            DEC     TIME
            BNE     L2
            DEC     COUNT
            BNE     L1
            RTS
```

;*****************************************************************
; Timer reset used in SWI and COP time out.
;
```
RST:        LDA     #50
            STA     COP
            RTI DEFSEG  VECTORS,ABSOLUTE
            SEG     VECTORS
            ORG     $07F0
COP         DB      0

ORG     $07F8

DW      RESET           ; Timer interupt
            DW      RESET           ; External interupt
            DW      RST             ; Software interupt
            DW      RESET           ; Reset interupt
            END
```

;*****************************************************************
; This subroutine is used to determine the value of the parity bit
; and add it to the EBS string to be sent.
;
```
PARITY:     BSET    3,FLAGS          ; Initialize parity flag as 1.
            LDX     #17
NEXT:       ROL     SECOND           ; Roll the second byte of data.
            ROL     FIRST            ; Roll the first byte of data.
            BCC     ZERO             ; If bit in "c" flag is 0, jump.
            LDA     FLAGS            ; If "c" flag is 1, toggle parity
            EOR     #%00001000       ; bit in FLAGS.
            STA     FLAGS
ZERO:       DECX                     ; If not all bits have been
            BNE     NEXT             ; checked, repeat loop.

BRCLR   3,FLAGS,E        ; If parity flag is clear, end.
            BSET    0,SECOND         ; If parity flag is set, set parity
E:          RTS                      ; bit in code to be sent.
```

;*****************************************************************
; This subroutine transmits a release code.
;

```
RELEASE:  LDA    #%10000000
          STA    FIRST
          BRCLR  4,FLAGS,OFFHK           ; Set up "skeleton" for code.
          BSET   5,FIRST OFFHK:    LDA    #%01111010
          STA    SECOND
          JSR    PARITY
          LDA    #16
          STA    BITS
          SWI
          JSR    SEND
          JSR    ONHOOK
          RTS ;************************************************************************
; This subroutine transmitts an "on-hook" to the CO so that the
; primary set will be returned to its proper status.
ONHOOK:   LDA    #20
          STA    TEMP
G:        JSR    DELAY
          SWI
          DEC    TEMP
          BNE    G
          LDA    #%10000000
          STA    FIRST
          BRCLR  4,FLAGS,J               ; Check if address is on AVT.
          BSET   5,FIRST
J:        LDA    #%11101010
          STA    SECOND
          SWI
          JSR    PARITY
          LDA    #16
          STA    BITS
          SWI
          JSR    SEND
          RTS ;************************************************************************
; This subroutine will echo or translate the keypad button and
; transmit the EBS code once a line has been selected.(NOTE: AVT stands
; for auxilary voice terminal.
;
ECHO:     LDA    #%10000000
          STA    FIRST
          BRCLR  4,FLAGS,F               ; If AVT flag is set, change
          BSET   5,FIRST                 ; address to 4 in EBS code.
F:        LDA    #%00000010
          STA    SECOND
          DEC    DIGIT
          LDX    DIGIT
          LDA    LIST,X                  ; Look up value for key pressed.
          LSLA
          LSLA                           ; Shift bits to proper position
          LSLA                           ; for code.
          ADD    SECOND
          STA    SECOND
          JSR    PARITY
          LDA    #16                     ; Reset value for loop count
          STA    BITS                    ; to 16 to transmit all bits.
          SWI
          JSR    SEND
          RTS
```

```
;*****************************************************************
; This subroutine is used to determine the EBS code required to
; open the new line.

OPEN:    BSET    5,FLAGS
         LDA     #%10000000      ; Set up "skeleton" for code.
         STA     FIRST
         LDA     #%00000010
         STA     SECOND
         LDA     ADDRESS
         CMP     #04
         BLO     PRIMRY          ; If line >= 4, set keypad
         BSET    4,FLAGS         ; address to 4 for AVT
                                 ; (auxilary voice terminal)

PRIMRY:  LDA     ADDRESS
         LSLA
         LSLA                    ; Shift bits to proper position
         LSLA                    ; for code.
         ADD     FIRST
         STA     FIRST LDA     LINE
         LSLA
         LSLA                    ; Shift bits to proper position
         LSLA                    ; for code.
         ADD     SECOND
         STA     SECOND
         JSR     PARITY
         LDA     #16             ; Reset value for loop count
         STA     BITS            ; to 16 to xmit all bits.
         SWI
         JSR     SEND
         RTS ;*****************************************************************
; This subroutine transmits an off-hook to the CO. The CO then
; returns a "voice off" command that will turn off the speaker on
; the primary set.

OFFHOOK: LDA     #20
         STA     TEMP
PAUSE:   JSR     DELAY
         SWI
         DEC     TEMP
         BNE     PAUSE
         LDA     #%10000000
         STA     FIRST
         BRCLR   4,FLAGS,I       ; Check if address is on AVT.
         BSET    5,FIRST
I:       LDA     #%11100010
         STA     SECOND
         SWI
         JSR     PARITY
         LDA     #16
         STA     BITS
         SWI
         JSR     SEND
         RTS
```

I claim:

1. An analog/digital lineman's telephone test set for connection to a single telephone line at a time having DTMF signalling means for signalling on analog lines, comprising:

(a) DTMF decoding means for converting DTMF tones to microprocessor compatible signals;
(b) microprocessor means for responding to said DTMF decoding means in a preprogrammed manner by outputting digitally encoded signals for signalling on digital telephone lines until a connection to a central office has been established through said single telephone line;

(c) said microprocessor means causing said lineman's telephone test set to revert to analog operation in response to said connection to said central office; and (d) means for signalling an on-hook condition through said DTMF signalling means to cause said microprocessor to output a digitally encoded on-hook signal to said central office.

2. The lineman's telephone test set as defined in claim 1, further comprising dial tone and ringing detectors for sensing dial tone and ringing signals on said single telephone line and causing said microprocessor to respond hereto.

3. The lineman's telephone test set as defined in claim 2, further comprising polarity indifferent power supply means for deriving power exclusively from said single telephone line to power said lineman's telephone test set.

4. The lineman's telephone test set as defined in claim 3, further comprising overvoltage protection means for disconnecting said power supply means in response to overvoltage conditions on said single telephone line.

* * * * *